Sept. 6, 1966

D. F. HILBIBER 3,271,660

REFERENCE VOLTAGE SOURCE

Filed March 28, 1963

INVENTOR.
DAVID F. HILBIBER

BY

Lippincott, Ralls & Hendrickson
ATTORNEYS

Sept. 6, 1966 D. F. HILBIBER 3,271,660
REFERENCE VOLTAGE SOURCE
Filed March 28, 1963 2 Sheets-Sheet 2
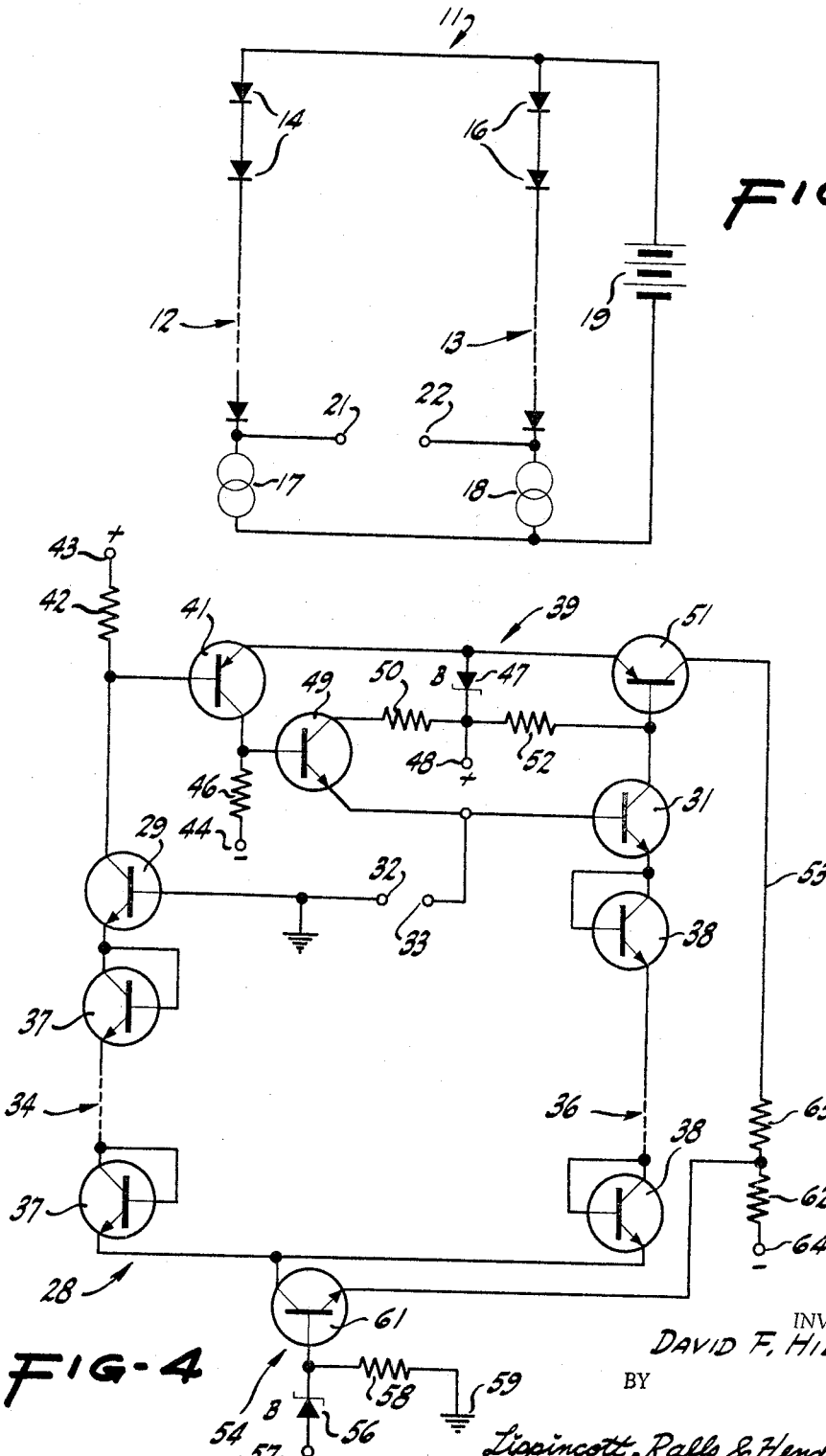
INVENTOR.
DAVID F. HILBIBER
BY
Lippincott, Ralle & Hendricson
ATTORNEYS

United States Patent Office 3,271,660
Patented Sept. 6, 1966

3,271,660
REFERENCE VOLTAGE SOURCE
David F. Hilbiber, Los Altos, Calif., assignor to Fairchild Camera and Instrument Corporation, Syosset, N.Y., a corporation of Delaware
Filed Mar. 28, 1963, Ser. No. 268,831
16 Claims. (Cl. 323—75)

This invention relates generally to the generation of a constant voltage which is suitable for use as a voltage standard or reference, and is more particularly directed to using p-n junctions to generate a stable reference voltage which is essentially independent of temperature.

Numerous electronic systems require voltages which are substantially constant regardless of changes in temperature and other environmental conditions, and which may thereby serve as a reference or standard to which other electrical quantities may be compared. For example, various precision instruments, such as strain gauges and the like, depend upon precise measurements of electromotive force for their operation. Commonly it is necessary to compare a standard electromotive force to a measured electromotive force from the instrument for purposes of calibration. As a further example, numerous control circuits require a substantially constant comparison reference voltage in the development of an error voltage signal which can be used to compensate the error and regulate the output to a constant value proportional to the reference voltage.

Where relatively precise standard or reference voltage is required, it has been the usual practice to employ a special type of electrolytic cell, commonly referred to as a standard cell, to generate a voltage having negligible variation with temperature. Where lesser precision is required, various regulated constant voltage circuits may be used to generate voltages having a low order temperature dependence which may be tolerated. Both of these prior art approaches to the problem, however, have limitations and disadvantages. The standard electrolytic cell is relatively fragile and bulky and, therefore, not well suited to applications wherein conservation of space, portability and ruggedness are involved. Regulated voltage circuits, on the other hand, must be highly complex to provide the small temperature dependence suitable for even low order precision service. Furthermore, both of the types of equipment have limited lifespans.

The objects of the present invention are: (1) to provide a method of generating an essentially temperature-stable voltage from p-n junctions with circuit arrangements having the normal attributes of compactness, ruggedness and long life of semiconductor devices; (2) to provide a method of obtaining a highly stable reference voltage from a network of forward biased p-n junctions with a temperature dependence which may be made arbitrarily small; (3) to provide a p-n junction standard voltage cell which has a high regulation factor, an extremely low noise level in the output voltage, a relatively low output impedance, and which may be arranged to produce an output voltage referenced to ground.

Additional objects and advantages of the invention will become apparent upon consideration of the following description taken in conjunction with the accompanying drawings, wherein:

FIGURE 3 is a schematic diagram of a circuit illustrating the generation of a temperature-independent voltage in accordance with the present invention; and FIGURE 4 is a schematic circuit diagram of a temperature-stable reference voltage source in accordance with the present invention as modified to provide an output voltage reference to ground and a low output impedance.

Figure 1:
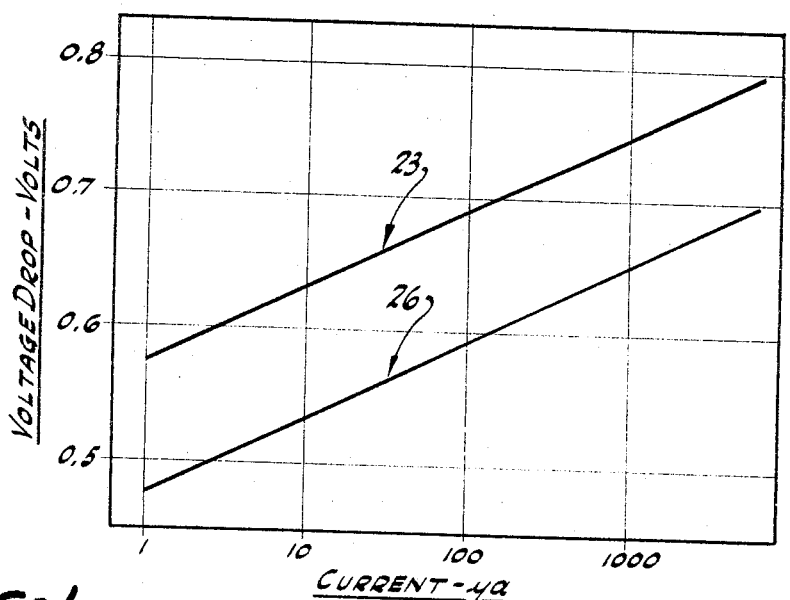
FIGURE 1 is a graph of junction voltage drop versus current for several specific types of forward biased p-n junctions as may be employed in the invention.
Figure 2:
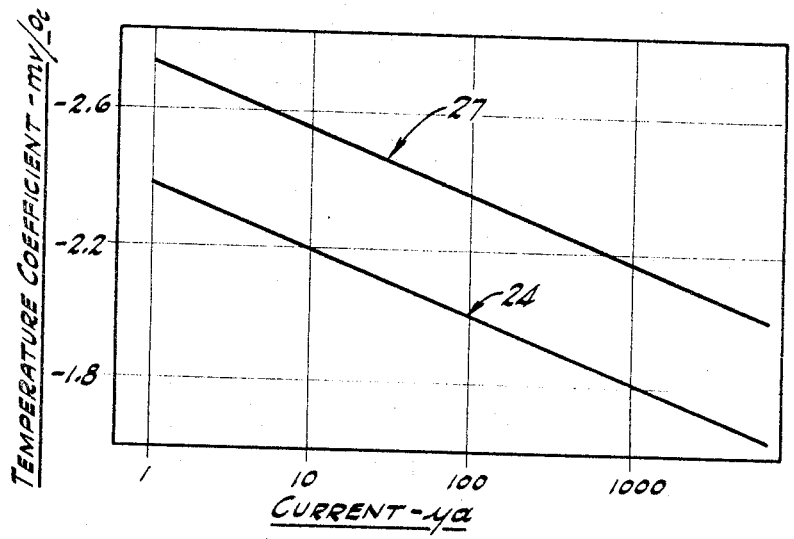
FIGURE 2 is a graph of temperature coefficient of junction voltage drop versus current for the p-n junctions of FIGURE 1.

Briefly stated, the present invention provides for the generation of a voltage which is independent of temperature to the extent that it may be employed as a reference or standard. In fact, the temperature dependence of voltage generated in accordance with the invention may be made arbitrarily small and it is a relatively simple matter to obtain a temperature dependence of the order of .001% or smaller. In generating such a voltage, cognizance is taken of the fact that the potential drop across a forward biased p-n junction is proportional to the logarithm of the junction current, as is shown in the graphs of FIGURE 1 depicting this characteristic for several specific types of junctions. Further, the junction potential drop is an inverse function of temperature, decreasing with increasing temperature. The rate of change of this potential drop with respect to temperature, i.e., the junction voltage temperature coefficient, is also a function of the junction current. This latter characteristic of p-n junctions is depicted in FIGURE 2 for the specific junction to which the graph of FIGURE 1 pertains. Such inversely related characteristics of a p-n junction are observed between the junction voltage and junction current of a junction diode, as well as between the emitter-base voltage and collector current of a transistor having its base directly connected to its collector, and thus can be termed a "transistor diode." Accordingly, the term "diode" as hereinafter employed, is defined as including simple p-n junction diodes and transistor diodes. As a consequence of the diode behavior just noted, an essentially temperature-independent voltage may be generated with such a diode. The planar, passivated surface type of transistor when connected as a diode possesses characteristics which are particularly well-suited to the generation of a predictably stable reference voltage in accordance with the method of the invention set forth below.

In accordance with the method of the invention, first and second potentials are generated by passing constant currents through a pair of circuit branches each including at least one, and preferably a plurality of forward biased p-n junctions or diodes. The currents through the respective circuit branches are adjusted such that the summations of the temperature coefficients of the junction voltage drops of one branch are equal to those of the other, while the sum of the voltage drops in one branch is different from those in the other. The potential difference between the total potential drop across one branch and the total potential drop across the other branch is, in turn, derived as a reference voltage. Inasmuch as the temperature coefficients, or dependences, of the respective branches are equal, they are cancelled in the potential difference and accordingly the reference voltage is substantially independent of temperature.

Numerous specific circuit arrangements may be provided with which the method outlined above may be conducted to facilitate generating a temperature-independent reference or standard voltage. One basic circuit is depicted in FIGURE 3. The standard cell, or reference voltage generator 11 includes first and second circuit branches 12 and 13, respectively, defined by a plurality of series-connected p-n junctions or diodes 14 and 16, respectively. Current sinks 17 and 18, or equivalent means, are provided in the branches 12 and 13 in series with the diodes 14 and 16 to adjust the currents in the circuits to constant values using the principles described above. Current flow, as adjusted to predetermined constant levels by the sinks 17 and 18, is established by means of a battery 19, or equivalent direct current source, connected across the opposite ends of the branches 12 and 13, in parallel with these branches to bias the diodes 14 and 16 in the forward direction. Output terminals 21 and 22 are connected to the negative terminals of the leading ones of the diodes 14 and 16 of the respective circuit branches. The potential appearing at terminal 21 is consequently the summation of voltage drops across diodes 14 while the potential appearing at terminal 22 is the summation of potential drops across diodes 16. The voltage appearing between terminals 21 and 22 is accordingly the difference between the summation of potential drops across the junctions of branch 12 and of branch 13.

With the basic circuit of FIGURE 3, the specific circuit parameters and the operation of the circuit may vary substantially, so long as temperature-independent voltage is generated. More particularly, the diodes 14 of branch 12 may all be identical to each other and the diodes 16 of branch 13 may all be identical to each other; but the diodes of branch 12 may be a different semiconductor material than the diodes of branch 13. For example, the diodes 14 may all be germanium while the diodes 16 are all silicon. Furthermore, the number of diodes 14 may be equal to the number of diodes 16, or it may not. In either case, the current sinks 17 and 18 or equivalent current adjusting means, are arranged to adjust the currents flowing through the respective branches 12 and 13 to levels for which the total temperature dependencies of branches 12 and 13 are equal. In other words, current levels are employed for which the summation of temperature coefficients of diodes 14 is equal to the summation of temperature coefficients for the diodes 16. Of course, the constant current levels must satisfy the further requirement that the summation of the potential drops across diodes 14 is different from the summation of potential drops across diodes 16.

Alternatively, all of the diodes 14 and 16 may be selected to be the semiconductor material silicon, for example; but the diodes of branch 12 will have a different doping level than the diodes of branch 13. The curves of FIGURES 1 and 2 are for two such diode devices of different doping levels. Curve 23 depicts the voltage drop across a relatively heavily-doped diode device (1210) while curve 24 depicts the temperature coefficient of the same device. Similarly, curves 26 and 27 depicts the junction voltage drop and temperature coefficient, respectively, of a relatively lightly-doped device (4400). From these curves it will be noted that the heavily-doped device has the largest junction voltage drop and the smallest temperature dependence for a given current. Now assume that the heavily-doped diodes are employed as the diodes 14 while the lightly-doped diodes are employed as the diodes 16, and the currents in the respective branches 12 and 13 are adjusted to an equal predetermined level. Under these circumstances, it will be appreciated that a greater number of the diodes 14 are required for a given current than the number of diodes 16 in order to make the temperature dependence of branch 12 equal to that of branch 13. As a specific example of this, six heavily-doped diode devices may be employed as the diodes 14 of branch 12 while five lightly-doped diode devices may be employed as the diodes 16 of branch 13. The current sinks 17 and 18 are then arranged to provide equal branch currents 171.5 microamps. For the branch currents of 171.5 microamps, from the temperature coefficient curves 24 and 27 of FIGURE 2, the total temperature coefficient of the five lightly-doped diode devices 16 is substantially equal to that of the six heavily-doped diode devices 14. With this arrangement, it has been observed in actual practice that an output voltage of 1.25668 volts is obtained between output terminals 21 and 22 having a temperature coefficient of less than 3 microvolts per degree centigrade for temperatures in the range of 21° to 27° C. The stability of the network has been observed to be better than .001% for over 600 hours of life testing. In addition, the noise level of the output voltage is extremely low; i.e., less than 10 microvolts.

A further arrangement of the voltage generator 11 may be employed in the generation of a substantially temperature-independent reference voltage. All diodes of both branches 12 and 13 may be identical. For example, diodes 14 and 16 may be both the heavily-doped devices 1210 noted above to have the characteristics depicted in FIGURES 1 and 2. Curves 26, 27 of these figures show that as the junction current is decreased, the junction voltage decreases but the temperature dependence increases. Now, if the branches 12 and 13 are biased by current sinks 17 and 18 at different current levels, it will be appreciated that more diodes will be required in the branch operating at the higher current in order to provide a temperature dependence which is substantially equal to the branch operating at the lower current. Assume, for example, that branch 12 is operated at a current of 10 microamps while branch 13 is operated at a current of 100 microamps. For these currents curve 27 shows that the diodes 14 of branch 12 each have a temperature coefficient of the order of —2.21, whereas the diodes 16 of branch 13 each have a temperature coefficient of the order of —2.01. Using these values of temperature coefficients it can be calculated that with then diodes 14 in branch 12 and eleven diodes 16 in branch 13, the summations of the temperature coefficients of the respective branches are substantially equal. In addition, from curve 26 it will be noted that the potential drop acros each diode of branch 12 when operated at junction current of 10 microamps, is approximately 0.662. Similarly, the potential drop across each diode 16 of branch 13 for the junction current of 100 microamps is approximately 0.7 volt. Thus, the total potential drop across the ten diodes 14 of branch 12 is approximately 6.62 volts whereas the total potential drop across the eleven diodes 16 of branch 13 is approximately 7.70 volts. As a result, the potential difference between terminals 21 and 22 is approximately 1.08 volts, and this voltage is essentially independent of temperature inasmuch as the total dependences of branches 12 and 13 are substantially equal.

It will be thus appreciated that an essentially temperature independent reference voltage may be generated by the circuit of FIGURE 3 utilizing any of the various alternative diode arrangements discussed above and operating the circuit in accordance with the method of the invention. Not only is the temperature dependence of the output voltage of a substantially negligible order, but in addition, the output voltage possesses a good regulation factor. This will be apparent from the curves of FIGURE 1, showing that a unit change in biasing current causes a much smaller change in junction voltage due to the logarithmic nature of the curves. Hence, the voltage output is substantially constant irrespective of fluctuations in biasing current.

One particular advantageous extension of the basic circuit of FIGURE 3, is shown in FIGURE 4. A reference voltage generator 28 is arranged to provide a very low output impedance voltage (referred to ground) which may be made substantially temperature independent through operation of the circuit by the method of the invention. Basically, generator 28 is a differential amplifier which includes a pair of differential amplifier transistors 29 and 31. These transistors are coupled to output terminals 32 and 33, the first of which is connected to ground. The transistors produce a signal at output terminals 32 and 33 which is equal to the difference between voltages respectively coupled to the inputs of the transistors. In accordance with the present invention, the input voltages to the differential transistors 29 and 31 are respectively provided as the total potential drops across circuit branches 34 and 36. These drops are defined by pluralities of serially-connected junction diodes 37 and 38. Preferably, these junction diodes are transistor diodes as depicted in FIGURE 4. The bases of these transistors are in common connection with the collectors. The generator further includes current regulating means, as generally indicated at 39, coupled to the differential transistors 29 and 31 and the branches 34 and 36 to maintain flow of constant currents of predetermined levels through the two branches. The currents through branches 34 and 36 are adjusted to magnitudes which are commensurate with equal total temperature dependences of the diodes 37 and 38 in the respective branches, while simultaneously providing total voltage drops across the respective branches which are unequal. Inasmuch as the differential transistors 29 and 31 produce an output voltage between terminals 32 and 33 which is equal to the difference between the applied input voltages (i.e., the total potential drops across diodes 37 and 38 of the respective branches 34 and 36), such output difference voltage is substantially independent of temperature due to the equality in temperature dependence of the two branches. Moreover, since terminal 32 is connected to ground, the difference voltage between the terminals is also referred to ground.

In the preferred arrangement of the voltage generator 28 generally outlined above, the differential amplifier transistors 29 and 31 are of NPN type. The bases of these transistors are respectively connected to the terminals 32 and 33, while the emitters are respectively in series-connection with branches 34 and 36 of serially-connected diodes 37 and 38. The collectors of transistors 29 and 31 are coupled to the current-regulating means 39. The regulating means advantageously includes a PNP transistor 41 having its base connected to the collector of transistor 29. In addition, the collector of transistor 29 is connected to a bias resistor 42, which in turn is connected to a source of positive bias as generally indicated at 43. The collector of transistor 41 is coupled to a source of negative bias, as generally indicated at 44, through a bias resistor 46. The emitter of this transistor is maintained at a substantially constant positive bias, as by means of a breakdown diode 47 having its positive terminal connected to the emitter and its negative terminal connected to a source of positive bias generally indicated at 48. The collector of transistor 41 is additionally connected to the base of NPN transistor 49. The collector of transistor 49 is coupled by means of a resistor 50 to the bias source 48, while the emitter is connected to the base of differential transistor 31, and therefore to output terminal 33. The current regulating means 39 further includes a PNP transistor 51 having its base connected through a resistor 52 to the source of positive bias 48 and to the collector of differential transistor 31. A constant positive bias is maintained at the emitter of transistor 51 by connection of same to the positive terminal of breakdown diode 47. The collector of transistor 51 is coupled through a feedback loop 53 to a constant current generator, or sink, as generally indicated at 54, which is commonly connected to the branches 34 and 36 of series-connected diodes 37 and 38 to maintain the current flow through the branches at constant magnitudes. The constant current sink 54 advantageously comprises a breakdown diode 56 having its positive terminal connected to a source of negative bias, as generally indicated at 57, and its negative terminal connected to a resistor 58, in turn connected to ground as indicated at 59. The negative terminal of breakdown diode 56 is also connected to the base of NPN transistor 61, the collector of which is in common connection with the branches 34 and 36. The emitter of transistor 61 is coupled to the feedback loop 53 by connection of the transistor to the midpoint of a pair of series-connected feed-back resistors 62 and 63, respectively connected to a negative bias source as indicated at 64, and to the collector of transistor 51.

In general, transistors 41 and 49 of the current regulating means 39 are employed to achieve a sufficient power gain to drive the output terminal 33. Transistor 51 is used to provide both a symmetry of loading on the differential transistors 29 and 31 and to furnish a regulatory feedback to the constant current sink 54 through the feedback loop 53. More particularly, in the operation of the regulating means 39, it may be assumed that terminal 32 is made positive with respect to terminal 33. As a result, the collector current of transistor 29 will increase, causing the collector current of transistor 41 to increase, and in turn causing the emitter current of transistor 49 to increase and thereby making terminal 33 become more positive. Consequently, the collector and emitter currents of transistor 31 will increase, thus tending to decrease the emitter current of transistor 29. More particularly, the current through sink 54, which is a constant because of the curcuit configuration and the regulatory feedback action of transistor 51 and feedback loop 53, is equal to the sum of the emitter currents of transistors 29 and 31 respectively. The sink current being constant, an increase in the emitter current of transistor 31 is hence accompanied by a decrease in the emitter current of transistor 29. It will be thus appreciated that the differential amplifier will attain a state of equilibrium where the emitter currents of transistors 29 and 31 are continuously maintained at substantially constant values. The parameters of the generator circuit 28 may be appropriately selected such that the constant current magnitudes maintained in the emitters of transistors 29 and 31, and thus in the branches 34 and 36 through the diodes 37 and 38 are commensurate with substantially equal temperature dependences in the respective branches. Thus, in accordance with the basic concepts of the present invention, the temperature dependences are cancelled in the difference voltage generated between terminals 32 and 33, whereby such voltage may be employed as a temperature independent reference of standard, referenced to ground. In addition, the output impedance at terminals 32 and 33 is very low.

The present invention thus provides a method and means for generating an essentially temperature-independent reference voltage in a relatively simple manner using p-n junctions having inherent advantageous characteristics of small size, light weight, ruggedness, portability and the like. Although the invention has been described with respect to specific embodiments of the method and apparatus, it will be appreciated that various modifications and changes may be made in these specific embodiments without departing from the true spirit and scope of the invention, and thus it is not intended to limit the invention except by the terms of the following claims.

What is claimed is:

1. A method of establishing a temperature-stable reference voltage which comprises generating first and second potential levels by passing constant currents through first and second pluralities of serially-connected forward biased p-n junctions, adjusting the summation of temperature coefficients of said first plurality of junctions equal to the summation of temperature coefficients of said second plurality of junctions, and deriving a potential difference between said first and second potential levels as a reference voltage.

2. A method of establishing a temperature-stable voltage which comprises generating a first additive series of potential drops by passing a first current through a first circuit branch of series-connected forward biased p-n junctions, generating a second additive series of potential drops by passing a second current through a second circuit branch of series-connected forward biased p-n junctions, and adjusting said first and second currents to constant levels productive of a total of said first series of potential drops different from a total of said second series of potential drops while being simultaneously productive of equal total temperature dependences of said first and second circuit branches, whereby the difference voltage between said total of said first series of potential drops and said total of said second series of potential drops is constant with respect to temperature.

3. A temperature-stable voltage generator comprising first and second circuit branches formed of pluralities of series-connected forward biased p-n junctions, means generating constant currents through said first and second circuit branches, said currents being of levels to establish equal total temperature dependences of said first and second branches, and means for deriving the difference between the potential drops across said first and second branches respectively as a temperature-stable voltage.

4. A temperature-stable voltage generator according to claim 3, further defined by the junctions of said first branch being identical and the junctions of said second branch being identical while the junctions of said first branch are of different semiconductor material than the junctions of said second branch, and the junctions of said first branch being equal in number to the junctions of said second branch.

5. A temperature-stable voltage generator according to claim 3, further defined by the junctions of said first and second branches being of the same semi-conductor material but respectively having different doping levels, said junctions of said first branch being unequal in number to the junctions of said second branch, and the levels of said current flows through said first and second branches being equal.

6. A temperature-stable voltage generator according to claim 3, further defined by the junctions of said first and second branches being identical but respectively of unequal number, and the levels of said currents through said first and second branches being different from each other.

7. A reference voltage cell comprising a first circuit branch of a first plurality of series-connected transistor diodes each having a potential drop thereacross varying as a direct function of current therethrough and a temperature coefficient varying as an inverse function of current therethrough, a second circuit branch of a second plurality of series-connected transistor diodes each having a potential drop thereacross varying as a direct function of current therethrough, and a temperature coefficient varying as an inverse function of current therethrough, voltage bias means coupled across said branches biasing said diodes in the forward direction, current sink means in series connection with said branches regulating the respective current flows therethrough to levels for which the total of said temperature coefficients of said first plurality of diodes is equal to the total of said temperature coefficients of said second plurality of diodes while the total of said potential drops of said first plurality of diodes is unequal the total of said potential drops of said second plurality of diodes, and output terminal means coupled to said branches for deriving the respective totals of potential drops of said first and second pluralities of diodes therefrom.

8. A reference voltage generator comprising a first circuit branch including a first plurality of diodes and a first current sink connected in series, a second circuit branch including a second plurality of diodes and a second current sink connected in series, a direct current voltage supply in parallel connection with said first and second branches to bias the diodes thereof in forward directions, and a pair of output terminals respectively connected to the leading ones of said first and second pluralities of diodes, said first and second current sinks regulating the currents in said first and second branches to levels for which the total temperature coefficients of said first and second pluralities of diodes are equal and the total potential drops thereacross are unequal.

9. A reference voltage generator according to claim 8, further defined by said transistor diodes being planar transistors each having their base and collector commonly connected.

10. A reference voltage generator comprising difference amplifier means including first and second inputs and first and second outputs for producing a voltage between the outputs equal to the difference between voltages applied to the inputs, one of said outputs connected to ground, a first plurality of series-connected semiconductor diode devices coupled to said first input, a second plurality of series-connected semiconductor diode devices coupled to said second input, means biasing said diode devices in a forward direction, and current regulating means coupled to said difference amplifier means and pluralities of diode devices for establishing constant levels of equilibrium current flow therethrough for which the respective totals of the temperature coefficients of the first and second pluralities of diode devices are equal and the respective totals of the potential drops thereacross are unequal.

11. A reference voltage generator comprising first and second differential transistors, output terminals respectively coupled to the bases of said transistors, one of said terminals connected to ground, first and second pluralities of series-connected semiconductor diode devices respectively connected to the emitters of said first and second transistors, voltage bias means coupled to the collectors of said transistors and to said first and second pluralities of diode devices to apply forward bias thereto, and current regulating means coupled between said transistors and said pluralities of diode devices for establishing constant levels of equilibrium current flow through the latter for which the respective totals of the temperature coefficients of the first and second pluralities of diode devices are equal and the respective totals of the potential drops thereacross are unequal.

12. A reference voltage generator comprising first and second NPN transistors, output terminals respectively connected to the bases of said transistors, one of said terminals connected to ground, first and second pluralities of semiconductor diode devices respectively connected in series with the emitters of said first and second transistors, constant current sink means commonly connected to said first and second pluralities of diode devices to maintain the summation of currents therethrough at a constant level, means applying positive potential bias to the collectors of said transistor, first and second PNP transistors having their bases respectively connected to the collectors of said first and second NPN transistors, means biasing the emitters and collectors of said first and second PNP transistors in forward directions, a third NPN transistor having its base connected to the collector of said first PNP transistor and its emitter connected to the base of said second NPN transistor, and means applying positive potential bias to the collector of said third NPN transistor, said first and second pluralities of diode devices respectively having total temperature coefficients at the levels of current flow therethrough which are equal and total potential drops thereacross which are unequal.

13. A reference voltage generator according to claim 12 further defined by feedback loop means coupled between the collector of said second PNP transistor and said constant current sink means to regulate the flow of current through the latter proportionate to current flow through the former.

14. A reference voltage generator comprising first and second NPN transistors, output terminals respectively connected to the bases of said transistors, one of said terminals connected to ground, first and second pluralities of semiconductor diode devices respectively connected in series with the emitters of said first and second transistors, means applying positive potential bias to the collectors of said transistors, first and second NPN transistors having their bases respectively connected to the collectors of said first and second NPN transistors, means applying negative potential bias to the collector said first PNP transistor, a breakdown diode having its positive terminal commonly connected to the emitters of said first and second PNP transistors, means applying positive potential bias to the negative terminal of said breakdown diode, a pair of feedback resistors series connected between the collector of said second PNP transistor and a source of negative potential bias, a third NPN transistor having its base connected to the collector of said first PNP transistor and its emitter connected to the base of said second NPN transistor, means applying positive potential bias to the collector of said third NPN transistor, a fourth NPN transistor having its emitter connected to the juncture between said feedback resistors and its collector commonly connected in series with said first and second pluralities of diode devices, a second breakdown diode having its negative terminal connected to the base of said fourth NPN transistor, means applying negative potential bias to the positive terminal of said second breakdown diode, and a resistor connected between the negative terminal of said second breakdown diode and ground, said first and second pluralities of diode devices respectively having total temperature coefficients at the levels of current flow therethrough which are equal and total potential drops thereacross which are unequal.

15. A reference voltage generator according to claim 14, further defined by said diode devices being NPN transistors each having their base and collector commonly connected.

16. A reference voltage generator according to claim 15, further defined by said NPN transistors each having their base and collector commonly connected being planar transistors.

No references cited.

JOHN F. COUCH, *Primary Examiner.*

K. D. MOORE, *Assistant Examiner.*